Figure 3:
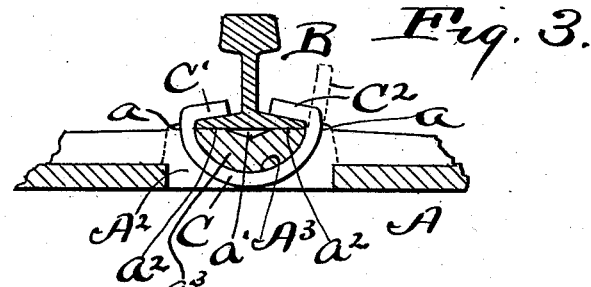
Figure 4:
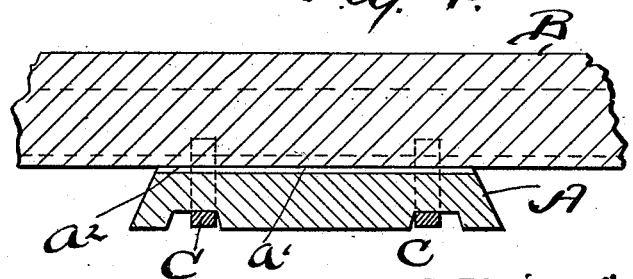
Figure 5:
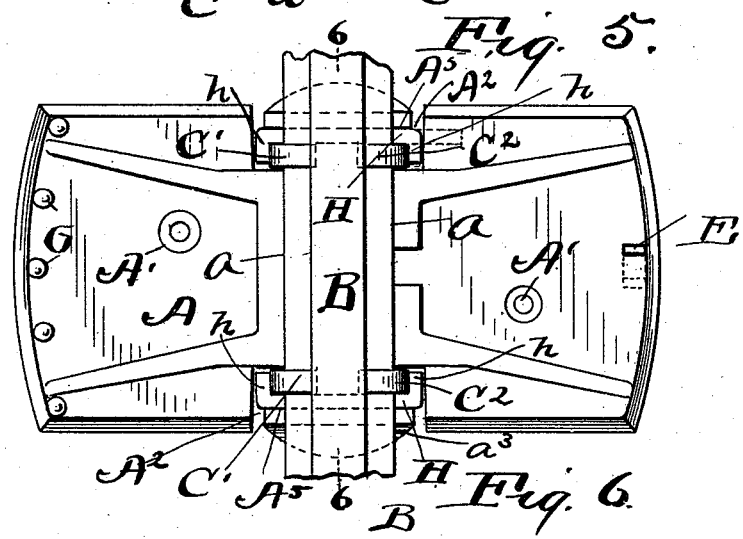
Figure 6:
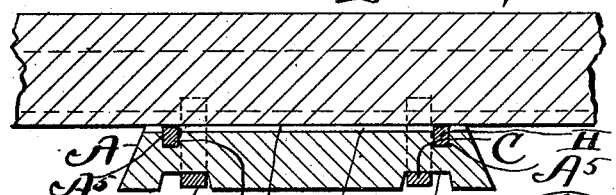

(No Model.) 2 Sheets—Sheet 2.
T. D. WEST & G. H. BOYD.
METALLIC SLEEPER FOR RAILWAY TRACKS.

No. 578,476. Patented Mar. 9, 1897.

UNITED STATES PATENT OFFICE.

FRED WADHAMS WRIGHT, OF BATON ROUGE, LOUISIANA.

LEMON-JUICE EXTRACTOR.

SPECIFICATION forming part of Letters Patent No. 578,477, dated March 9, 1897.

Application filed April 15, 1896. Serial No. 587,620. (No model.)

*To all whom it may concern:*

Be it known that I, FRED WADHAMS WRIGHT, a citizen of the United States, and a resident of Baton Rouge, in the parish of East Baton Rouge and State of Louisiana, have invented certain new and useful Improvements in Lemon-Juice Extractors, of which the following is a specification, reference being had to the accompanying drawing, forming a part thereof, in which similar letters of reference indicate corresponding parts.

This invention relates to devices for extracting the juice of lemons and other fruit; and the object thereof is to provide an improved device of this class which is simple in construction and operation, while being also comparatively inexpensive, and which is also adapted to be used in connection with a bowl, goblet, or other vessel which is designed to receive the extracted juices.

The invention is fully disclosed in the following specification, of which the accompanying drawing forms a part, said drawing being a side view of the extractor.

In the practice of my invention I provide a device for extracting the juice of lemons and other fruit, which comprises two similar bars or plates A and B, which are pivotally connected at C and each of which is provided with a handle D at its free end, and one of the bars or plates A is provided centrally with a conical attachment E, which is provided with a shaft F, which extends therethrough, and to the lower end of which is secured a crank G, having a handle *g*.

The base of the conical attachment E rests upon the plate or bar A, and said attachment is provided with vertical grooves H, which extend from the bottom to the apex thereof and which converge to a point at said apex and by means of which similarly-formed vertical ribs *h* are formed, and the plate or bar B is provided centrally thereof with a circular opening K, above which is placed a hollow conical attachment *k*, which is formed on or secured to the plate or bar B, and the interior of the attachment *k* and the circular opening K through the plate or bar B together correspond with the form of the conical attachment E, and the interior of the conical attachment *k* may also be provided with vertical grooves and ribs, if desired.

When the plates or bars A and B are pressed together, the conical attachment E on the plate or bar A enters the hollow conical attachment K of the plate or bar B, and the operation will be readily understood from the foregoing description when taken in connection with the accompanying drawing and the following statement thereof.

In practice a lemon is divided preferably transversely of its longitudinal axis, and one part thereof is inserted through the opening K and into the conical attachment *k*, and the plates or bars A and B are then brought together by means of the handles D, and the conical attachment E is turned by means of the crank G, and in this operation the juice of the lemon is entirely extracted and flows down over the attachment E and around the base thereof into the proper receptacle, over which the device is held.

My improved lemon-juice extractor may be made of any desired material, but in practice I prefer to select material that will not corrode or be injuriously affected by acids or other fluids, and it will thus be seen that I provide an improved lemon-juice extractor which is simple in construction and operation and by means of which the juice of the lemon may be quickly and easily extracted without extracting the oil of the rind thereof.

Having fully described my invention, I claim as new and desire to secure by Letters Patent—

The herein-described device for extracting the juice of lemons and other fruit consisting of two hinged parts having handles formed on their free ends, one of said parts carrying a cone having a corrugated outer surface mounted on a shaft passing through said part, the outer end of said shaft having a shank and handle whereby the cone may be rotated, the other of said parts being provided with an opening above which is placed a hollow cone adapted to receive the first-mentioned cone, constructed and adapted to operate in the manner specified.

In testimony that I claim the foregoing as my invention I have signed my name, in presence of the subscribing witnesses, this 4th day of April, 1896.

FRED WADHAMS WRIGHT.

Witnesses:
LAWRENCE DOWNEY,
KIRBY SMITH COLLINS.